United States Patent
Noh et al.

(10) Patent No.: US 7,387,399 B2
(45) Date of Patent: Jun. 17, 2008

(54) LINEAR SIDE EMITTER, BACKLIGHT SYSTEM AND LIQUID CRYSTAL DISPLAY USING THE SAME

(75) Inventors: Ji-whan Noh, Suwon-si (KR); Dong-ha Kim, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 208 days.

(21) Appl. No.: 11/361,975

(22) Filed: Feb. 27, 2006

(65) Prior Publication Data
US 2006/0193149 A1     Aug. 31, 2006

(30) Foreign Application Priority Data
Feb. 26, 2005     (KR)     ............. 10-2005-0016262

(51) Int. Cl.
*G09F 13/04*     (2006.01)
*H01L 29/22*     (2006.01)
(52) U.S. Cl. .................. 362/97; 362/612; 362/240; 362/241; 362/245; 257/98; 257/100
(58) Field of Classification Search ............. 362/612, 362/97, 240, 241, 245; 349/64, 67; 257/89, 257/98, 100
See application file for complete search history.

(56) References Cited

U.S. PATENT DOCUMENTS

| | | | |
|---|---|---|---|
| 5,825,051 | A | 10/1998 | Bauer et al. |
| 6,190,020 | B1 | 2/2001 | Hartley |
| 6,674,096 | B2 | 1/2004 | Sommers |
| 6,679,621 | B2 | 1/2004 | West et al. |
| 2006/0067640 | A1 | 3/2006 | Hsieh et al. |
| 2006/0164861 | A1 | 7/2006 | Maeda et al. |

FOREIGN PATENT DOCUMENTS

| | | |
|---|---|---|
| EP | 0 945 673 A1 | 9/1999 |
| EP | 1 376 708 A2 | 1/2004 |
| JP | 09-018058 A | 1/1997 |
| JP | 10-082916 A | 3/1998 |

*Primary Examiner*—Ismael Negron
(74) *Attorney, Agent, or Firm*—Sughrue Mion, PLLC

(57) ABSTRACT

A linear side emitter, a backlight system and a liquid crystal display using the same are provided. The linear side emitter includes a plurality of LED chips, a bottom portion, a reflecting surface, and side surfaces. The LED chips arranged in a line on the bottom portion. The reflecting surface is disposed above the bottom portion and reflects light exiting the LED chips. The side surfaces are formed at both sides of the LED chip array line and transmit light is reflected by the reflecting surface and light reflected by the reflecting surface and then reflected by the bottom portion. The side surfaces each have at least one bend formed therein.

32 Claims, 8 Drawing Sheets

LINEAR SIDE EMITTER, BACKLIGHT SYSTEM AND LIQUID CRYSTAL DISPLAY USING THE SAME

CROSS-REFERENCE TO RELATED PATENT APPLICATION

This application claims priority from Korean Patent Application No. 10-2005-0016262, filed on Feb. 26, 2005, in the Korean Intellectual Property Office, the disclosure of which is incorporated herein in its entirety by reference.

BACKGROUND OF THE INVENTION

1. Field of the Invention

The present invention relates to a linear side emitter, a backlight system, and a liquid crystal display using the same.

2. Description of the Related Art

A liquid crystal display (LCD) is a type of flat panel display. An LCD is not a self-luminant display but rather utilizes external incident light from. A backlight system may be installed behind an LCD to irradiate light.

Backlight systems are classified as either direct light type systems or edge light type systems. Direct light type backlight systems directly irradiate light to a liquid crystal panel, where the light is emitted from light sources disposed directly below an LCD. Edge light type backlight systems transfer light, which is emitted from a light source installed at a side of a light guide panel (LGP), to a liquid crystal panel.

Direct light type backlight systems may use a light emitting diode (LED), which emits Lambertian light, as a point light source.

In direct light type backlight systems which use LEDs as point light sources, a plurality of LEDs are arranged in a 2-dimensional array. Specifically, the LEDs are aligned in a plurality of rows and columns.

Light emitted by the LEDs is diffused by a diffusing plate and the diffused light is irradiated on a liquid crystal panel. In order to prevent colored light from the LED array from appearing at the top portion of the diffusing plate, it is necessary to laterally transmit the light emitted from the LED array so that the light is incident on the diffusing plate.

FIG. 1 illustrates a conventional side emitting LED disclosed in U.S. Pat. No. 6,679,621.

Referring to FIG. 1, because the conventional side emitting LED uses a side emitter 1, Lambertian light emitted from an LED chip (not shown) with a given area can travel laterally through the side emitter 1. The side emitter 1 includes a funnel-shaped reflecting surface 3 inclined with respect to a central axis C', a first refracting surface 5 inclined with respect to the central axis C' to refract light reflected by the reflecting surface 3, and a second convex refracting surface 7 formed between a bottom surface 9 and the first refracting surface 5.

Light emitted by the LED array enters the side emitter 1. Light irradiated on the reflecting surface 3, inside the side emitter 1, is reflected by the reflecting surface 3. The reflected light is then transmitted laterally by the first refracting surface 5. Also, light transmitted toward the second convex refracting surface 7 in the side emitter 1 is transmitted laterally by the second refracting surface 7.

Since conventional side emitting LEDs laterally transmit light emitted by the LED chips, a side emitting LED array can also be used in direct light type backlight systems.

However, when conventional side emitting LEDs are used as point light sources, it is necessary to increase the distance between neighboring side emitting LEDs so as to sufficiently diffuse light emitted by the side emitting LED due to the large size of the side emitter 1. For example, when an LED chip emits Lambertian light in an area of 1 mm×1 mm, a gap between two neighboring side emitting LEDs should be larger than 10 mm.

This larger gap causes an increase in the thickness of the backlight system. This is because the mixing distance for producing uniform white light must be increased as the gap becomes larger.

SUMMARY OF THE INVENTION

The present invention provides a linear side emitter in which a plurality of LEDs forming a line are arranged with a sufficient density and in which light generated in the LED is emitted laterally, a sufficiently thin backlight system, and a liquid crystal display using the same.

According to an exemplary aspect of the present invention, there is provided a linear side emitter including: a plurality of LED chips; a bottom portion on which the LED chips are arranged in a line; a reflecting surface, disposed above the bottom portion, which reflects light exiting the LED chips; and side surfaces formed at both sides of the LED chip array line which transmit light reflected by the reflecting surface and light reflected by the reflecting surface and then by the bottom portion, the side surfaces each having at least one bend formed therein.

The bottom portion may be substantially flat or may include: a seat region having the LED chips arranged thereon; and an inclined reflecting region which is stepped with respect to the seat region and which reflects light reflected by the reflecting surface and then by the bottom portion.

The reflecting surface may be upwardly inclined from the LED chip array line toward the side surface.

The reflecting surface may be a curved surface symmetrical on both sides of the LED chip array line.

The reflecting surface may have a curvature satisfying an internal total reflection condition of light incident thereon from the LED chip array line.

The reflecting surface may be coated with reflection coating.

The at least one bend in the side surface may form a sawtooth pattern.

The LED chip array line may comprise LED chips which emit different colored light. The different-colored LED chips may be alternately arranged in the LED chip array line, and light may be mixed by the at least one bend in the side surface.

According to another aspect of the present invention, there is provided a backlight system including: a plurality of linear side emitters arranged in a plurality of lines on a base plate. Each of the linear side emitters has at least one of the features of the above-mentioned linear side emitter. The system also includes a reflective diffusion plate, which reflectively diffuses light received from the linear side emitters, and a first transmissive diffusion plate disposed above the linear side emitter to transmissively diffuse light received from the linear side emitters and from the reflective diffusion plate.

The backlight system may further include at least one of a brightness enhancement film which enhances the directionality of light exiting the first transmissive diffusion plate and a polarization enhancement film which enhances polarization efficiency.

According to a further another aspect of the present invention, there is provided a liquid crystal display including: a liquid crystal panel; and a backlight system which irradiates light on the liquid crystal panel. The backlight system has at least one of the features of the above-mentioned backlight system.

BRIEF DESCRIPTION OF THE DRAWINGS

The above and other features and aspects of the present invention will become more apparent from the following detailed description of exemplary embodiments thereof with reference to the attached drawings in which.

DETAILED DESCRIPTION OF EXEMPLARY EMBODIMENT OF THE INVENTION

Exemplary embodiments of the present invention will now be described more fully with reference to the accompanying drawings. The invention may, however, be embodied in many different forms and should not be construed as being limited to the exemplary embodiments set forth herein; rather, these embodiments are provided so that this disclosure will be thorough and complete, and will fully convey the concept of the invention to those skilled in the art.

Figure 2:
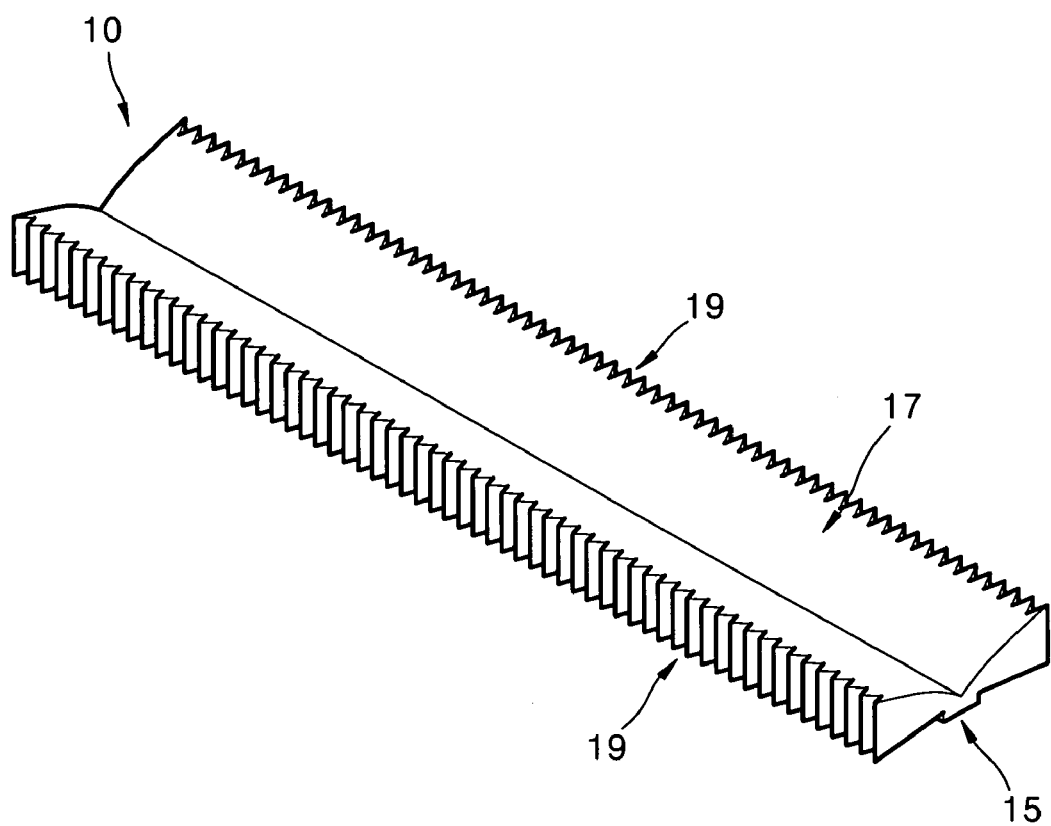
FIG. 2 is a perspective view of a linear side emitter according to an exemplary embodiment of the present invention.
Figure 3:
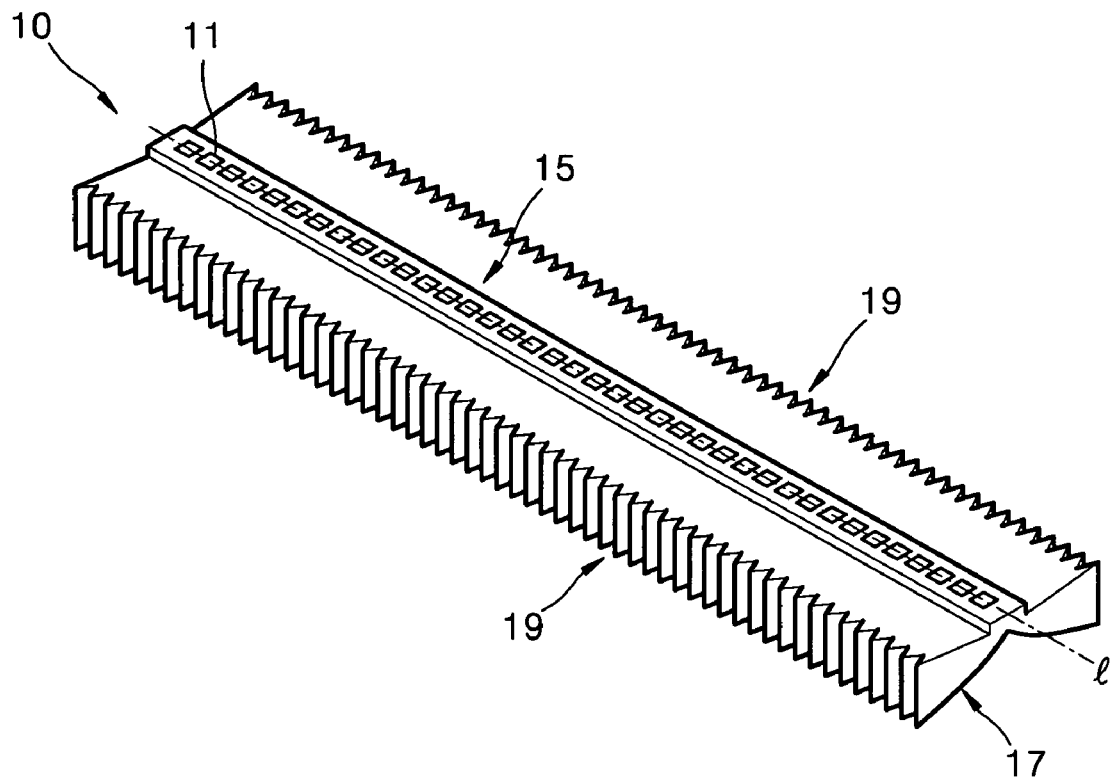
FIG. 3 is a rear perspective view of the linear side emitter shown in FIG. 2.
Figure 4:
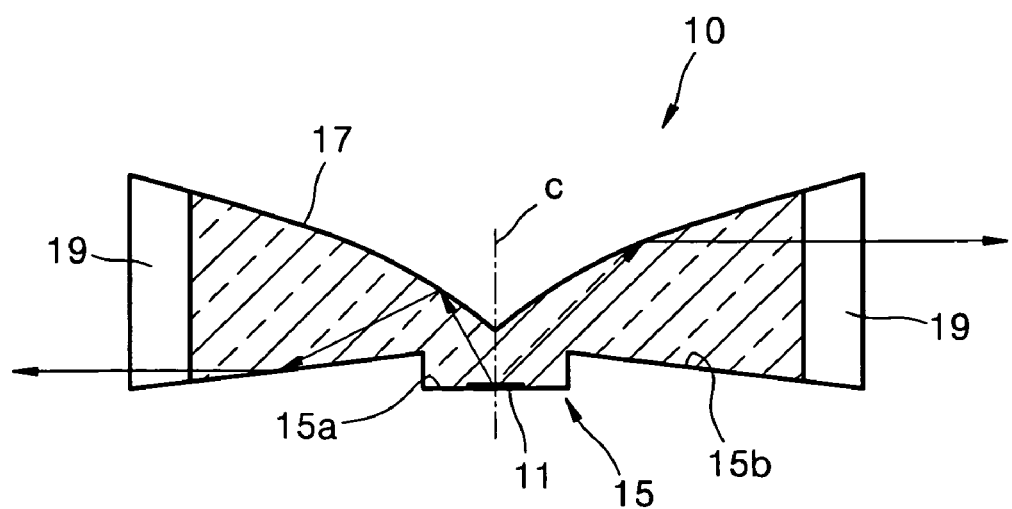
FIG. 4 is a sectional view of the linear side emitter shown in FIG. 2.

FIG. 2 is a perspective view of a linear side emitter according to an exemplary embodiment of the present invention, FIG. 3 is a rear perspective view of the linear side emitter shown in FIG. 2, and FIG. 4 is a sectional view of the linear side emitter shown in FIG. 2.

Referring to FIGS. 2 through 4, an exemplary linear side emitter 10 includes a bottom portion 15, a plurality of LED chips 11 arrayed in a line 1 on the bottom portion 15, a reflecting surface 17 forming a top portion, disposed over the bottom portion 15, to reflect light emitted from the LED chips 11, and sides 19 formed at both sides of the line 1.

In order to implement a white light source, an array of the LED chips 11 includes LED chips that emit different colors of light, for example, red (R), green (G), and blue (B) colors, which are alternately arranged.

The bottom portion 15 may include a seat region 15a on which the LED chips 11 are seated in a series, and a reflecting region 15b which is stepped and inclined with respect to the seat region 15a. The inclined reflecting region 15b reflects incident light from the reflecting surface 17 toward the side 19.

Figure 5:
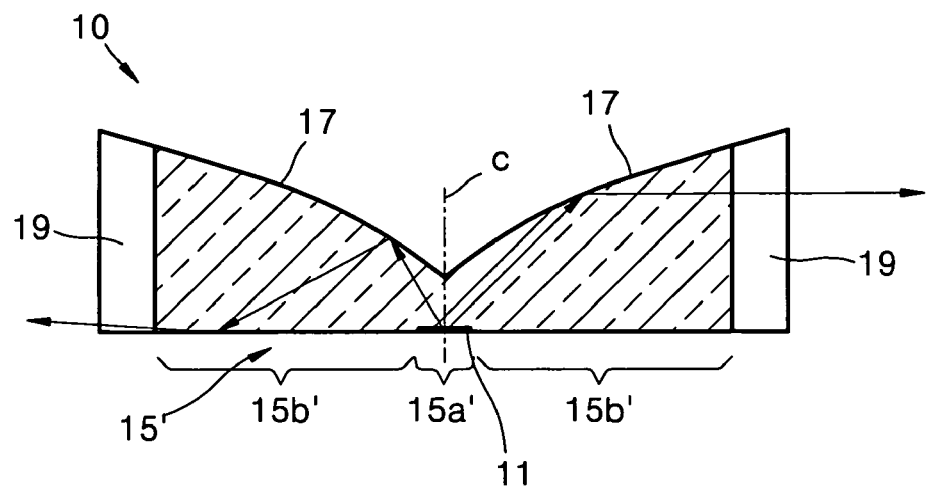
FIG. 5 is a sectional view of a linear side emitter according to another exemplary embodiment of the present invention.

FIG. 5 is a sectional view of a linear side emitter according to another exemplary embodiment of the present invention.

As shown in FIG. 5, a linear side emitter 10 according to the present invention includes a bottom portion 15' having a seat region 15a' and a flat reflecting region 15b'. FIG. 5 shows that the bottom portion 15' is flat. Alternatively, the linear side emitter 10 may include a stepped bottom portion having a flat reflecting region 15b' stepped with respect to the seat region 15a'.

Here, the reflecting regions 15b or 15b' of the bottom portion 15 or 15' may be a surface having no reflection coating. This is because the incident light, which is reflected by the reflecting surface 17 and is then incident on the reflecting region 15b or 15b', has an incident angle which is large enough to enable near total internal reflection at the reflecting regions 15b or 15b'. Also, the reflecting region 15b or 15b' may be a surface having a reflection coating for increasing the reflectance thereof.

The reflecting surface 17 may be upwardly inclined toward the side 19 to reflect incident light toward the side 19.

For example, the reflecting surface 17 may be a curved surface symmetrical with respect to the axis "c" of an arrangement line of the LED chips 11 as illustrated in FIGS. 2 through 5. The curved reflecting surface 17 may have curvature satisfying an internal total reflection condition of incident light that is emitted from the axis "c" toward the surface 17.

In actuality, a light generating region of the LED chip 11 has a given area. Accordingly, even when the reflecting surface 17 has a curvature satisfying an internal total reflection condition, at least a part of the light generated in a region deviating from the axis "c" may not satisfy the internal total reflection condition. Thus, there may exist light that does not satisfy the internal total reflection condition and thus penetrates the reflecting surface 17.

Accordingly, the reflecting surface 17 may be coated with reflection coating so that more light can travel laterally through the side 19.

Also, the reflecting surface 17 may be a surface without reflection coating while accepting a relatively low reflectance thereof. Further, the reflecting surface 17 may be a flat surface symmetrical with respect to the axis "c".

The side 19 laterally transmits a once-reflected incident light that has been reflected by the reflecting surface 17 and is then incident thereon, and twice-reflected incident light that has been reflected by the reflecting surface 17 and then by the bottom portion 15 and is then incident thereon.

The side 19 may be bent so that a mixing of light can occur more fully through reflection of the light. For example, the side 19 may be bent in a sawtooth pattern as illustrated in FIGS. 2 and 3.

Figure 6:
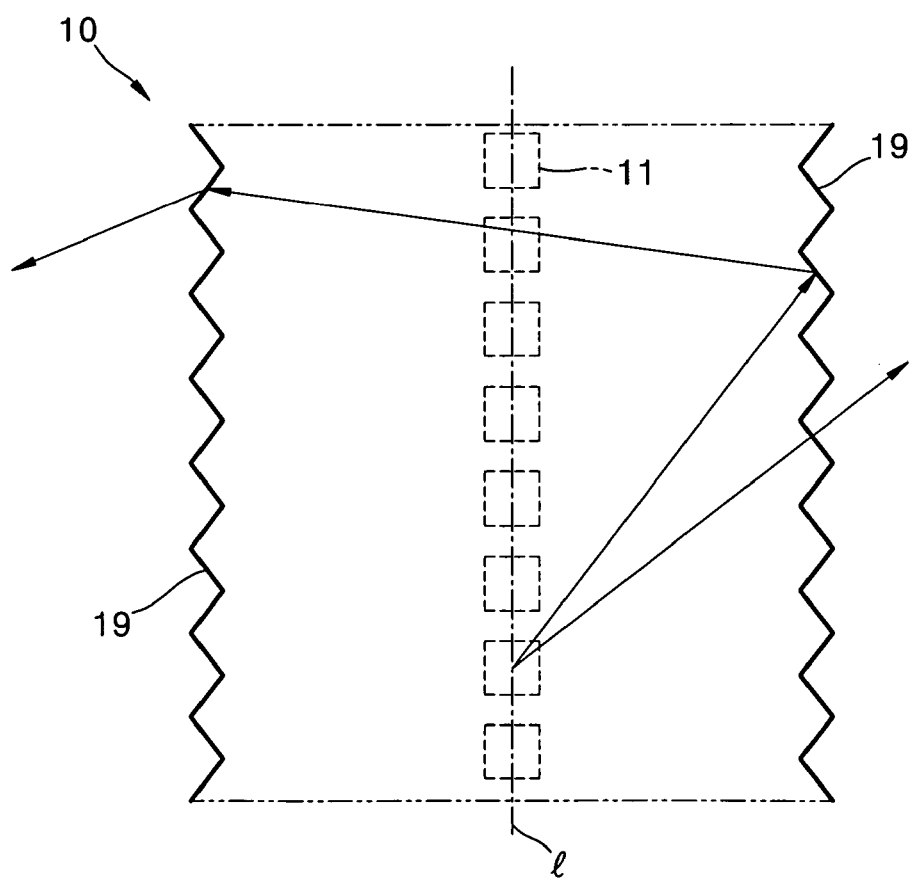
FIG. 6 illustrates exemplary light reflection and refraction paths due to a bend formed in both sides of the exemplary linear side emitter shown in FIG. 2.

FIG. 6 illustrates exemplary light reflection and refraction paths due to a bend formed in both sides of the linear side emitter shown in FIG. 2.

Referring to FIG. 6, when the side 19 has bent surfaces, light incident toward each bent surface penetrates the bent surface, is internally reflected, or is partially reflected and refracted by the bent surface according to its incident angle with respect to the bent surface. A part of light incident on one of sides 19 is reflected by the bent surface to travel toward an opposite side 19. This reflected light refractively penetrates one of the opposite sides 19 to travel laterally. Here, a part of the reflected light may be again reflected by the opposite side to travel toward the first side.

Figure 1:
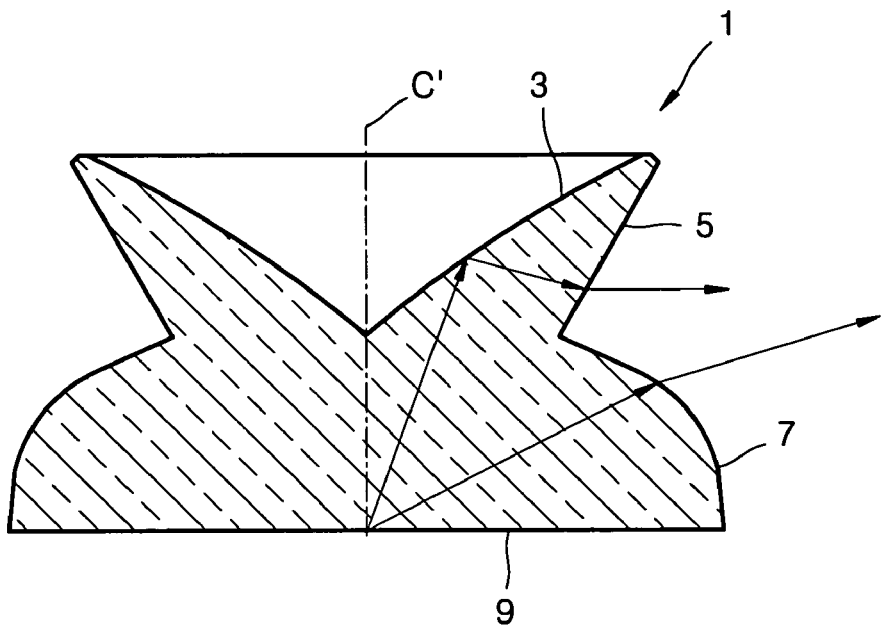
FIG. 1 is a view of a conventional side emitting LED disclosed in U.S. Pat. No. 6,679,621.

The linear side emitter 10 having the bent sides 19 provides more complex light paths than a conventional side emitting LED 1 having a rounded cross-section (see FIG. 1). Accordingly, the linear side emitter 10 can more efficiently mix the emitted light through the reflection process due to the bent surfaces of the sides 19. Also when R/G/B LED chips are arranged alternately in the line l, the linear side emitter 10 can efficiently mix the emitted color lights through the reflection process due to the bent surfaces.

The linear side emitter 10 includes a transparent body having the bottom portion 15, a reflecting surface 17, and sides 19. The transparent body is formed to adhere closely to the LED chips 11 through molding or injection molding using a transparent material. In FIGS. 2 through 5, the LED chips 11 are closely adhered to the seat regions 15a and 15a' without an air layer therebetween. The transparent material may have a refractive index matching that of the LED chips 11. This maximizes a light emission rate from the LED chip 11 because the light emission rate from the LED chip 11 is low when the LED chip 11 is not enclosed by an index-matching medium. Alternatively, instead of adhering the LED chips 11 closely to the transparent body of the emitter 10, it is also possible to interpose an index matching material between the transparent body and the LED chips 11.

The linear side emitter 10 laterally transmits most of the light emitted from the LED chips 11 through the sides 19. The length of the linear side emitter 10 and the number of the LED chips 11 may be determined according to system requirements.

Since the LED chips 11 are arranged in a line, they can be disposed with sufficient density. For example, when each LED chip 11 emits Lambertian light in an area of 1 mm×1 mm, an interval between two neighboring LED chips 11 may be narrower than 1 mm, or may be any desired value.

In this manner, since the LED chips 11 can be disposed with sufficient density, as desired, the linear side emitter 10 can reduce a mixing distance for obtaining uniform light distribution. Thus, when the linear side emitter 10 is employed in a backlight system, the backlight system can be sufficiently reduced in thickness.

Hereinafter, the uniformity of the light distribution when the linear side emitters 10 are arranged to form a plurality of lines will be compared with that when the conventional side emitting LEDs are arranged to form a plurality of lines.

Figure 7:
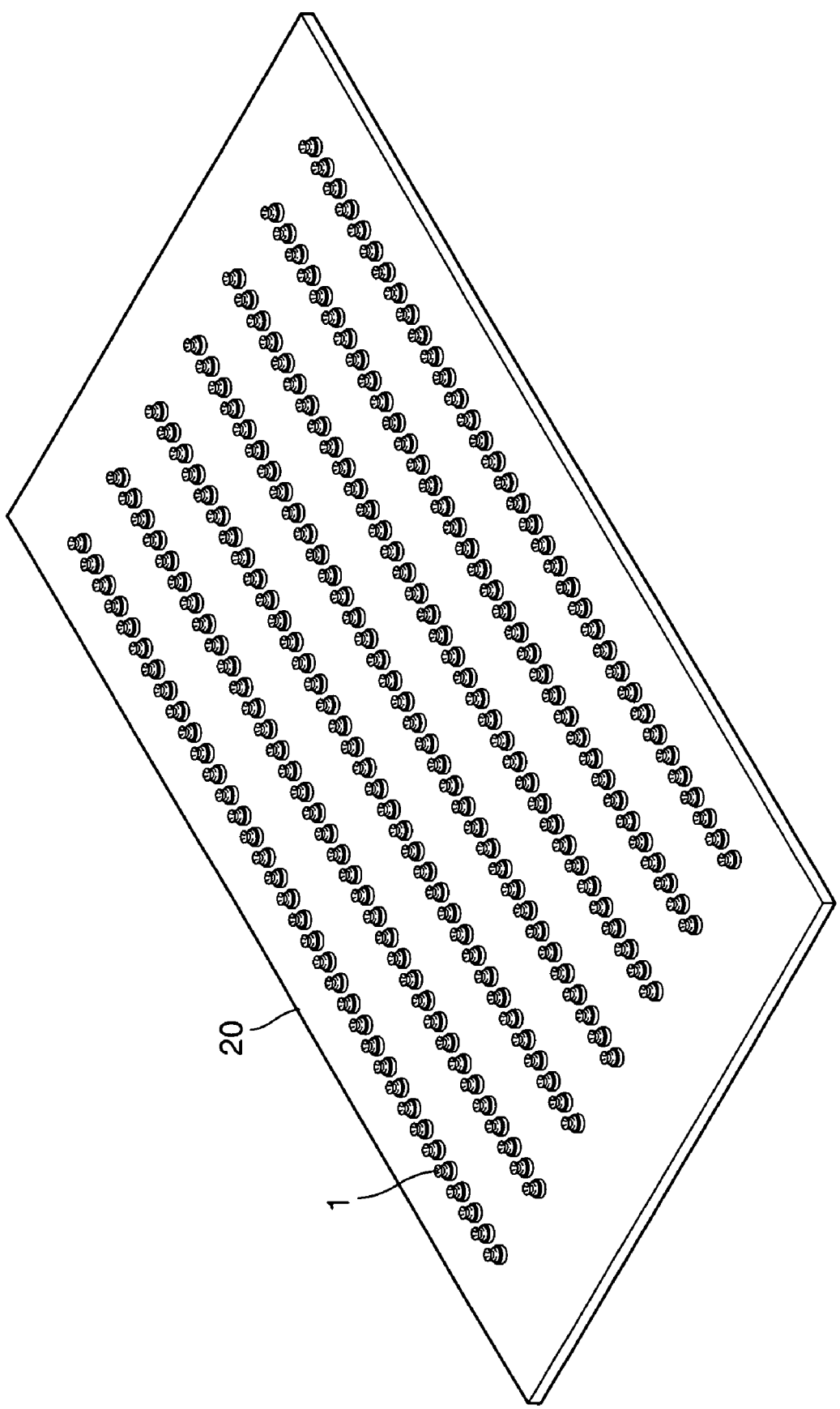
FIG. 7 illustrates an array of conventional side emitting LEDs arranged in 7 lines on a plate.
Figure 8:
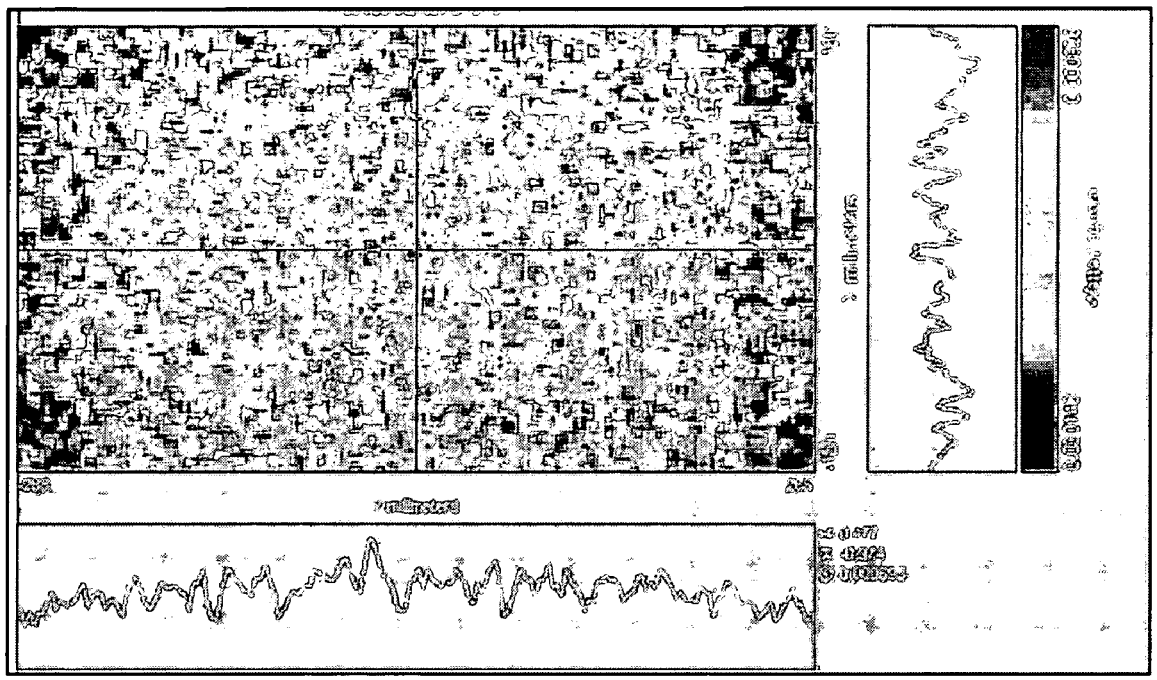
FIG. 8 illustrates an optical simulation result showing light intensity distribution obtained from the exemplary arrangement shown in FIG. 7.
Figure 9:
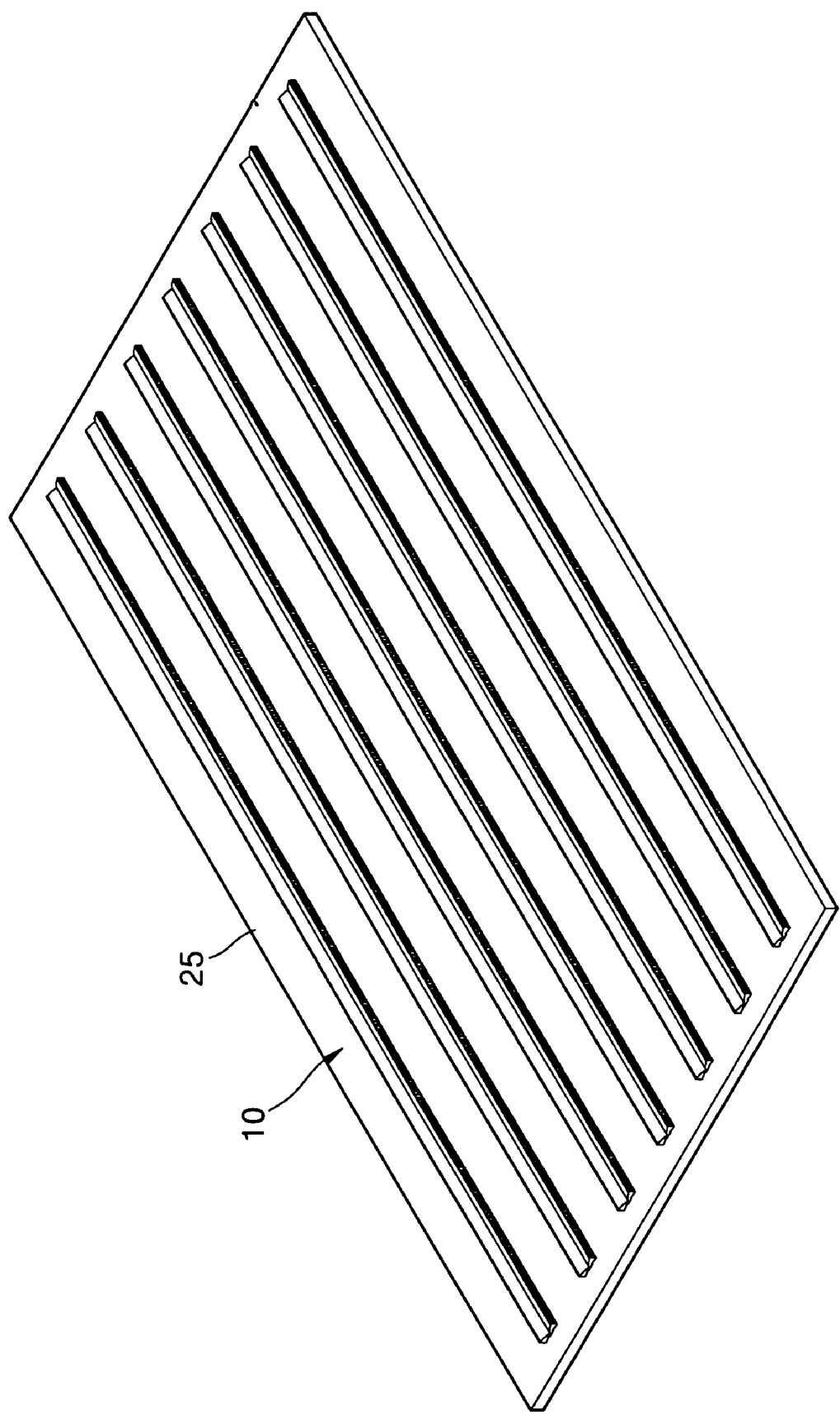
FIG. 9 illustrates an exemplary array of linear side emitters according to the present invention arranged in 7 lines on a plate.

FIG. 7 illustrates an array of conventional side emitting LEDs 1 arranged in 7 lines on a plate 20; and the FIG. 8 illustrates an optical simulation result of light distribution obtained from the LED array shown in FIG. 7. Likewise, FIG. 9 illustrates an array of the linear side emitters 10 arranged in 7 lines on a plate 25; and FIG. 10 illustrates an optical simulation result of light distribution obtained from the emitter array shown in FIG. 9.

For a fair comparison, the simulation was performed under the same conditions except a difference between the linear side emitter 10 and the conventional side emitting LED 1. That is, the numbers of the arranged LED chips in each line in FIGS. 7 and 9 were identical to each other and other light intensity measuring conditions (for example, a distance to a detector) were fairly set.

Figure 10:
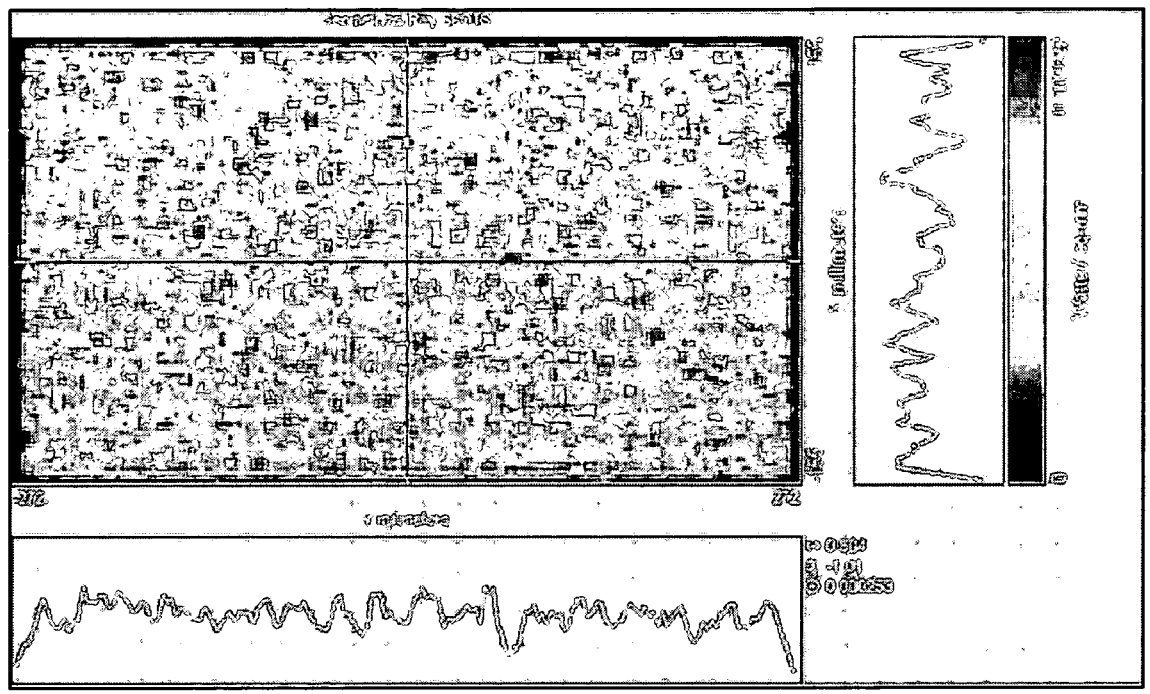
FIG. 10 illustrates an optical simulation result showing light intensity distribution obtained from the exemplary arrangement shown in FIG. 9.

As can be seen from FIGS. 8 and 10, when the linear side emitters 10 are used in a backlight system, uniform light can be generated due to the mixing of light by the bent surfaces of the sides 19 and thus fewer dark portions occur at corners of the backlight system. Accordingly, it is possible to implement a surface light source cable of providing a uniform light distribution. On the contrary, when the conventional side emitting LEDs 1 are used in the backlight system, significant dark portions occur at the corners. That is, when the conventional side emitting LEDs are used, the uniformity of light distribution is poor in comparison with the uniformity of light distribution obtained from the used of the linear side emitters 10.

Also, the linear side emitters 10 can be arranged more densely than the conventional side emitting LEDs, and thus can reduce a light mixing distance.

Further, the linear side emitters 10 can mix the emitted light using the bent surfaces of the sides 19, and thus can further reduce the light mixing distance.

Figure 11:
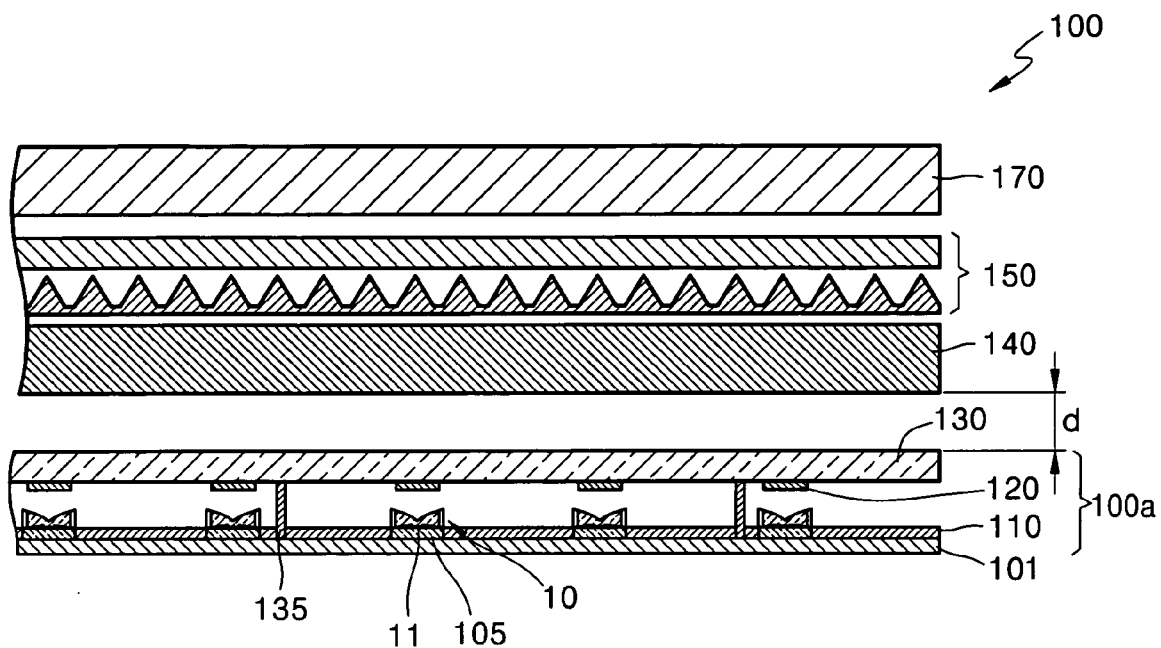
FIG. 11 is a sectional view of a backlight system using linear side emitters according to an exemplary embodiment of the present invention.

FIG. 11 is a sectional view of a backlight system 100 using the linear side emitters according to an exemplary embodiment of the present invention.

Referring to FIG. 11, a backlight system 100 includes a base plate 101, a plurality of linear side emitters 10 arranged in a plurality of lines on the base plate 101, a reflective diffusion plate 110 disposed under the linear side emitters 10 to reflectively diffuse incident light, and a transmissive diffusion plate 140 disposed over the linear side emitters 10 to transmissively diffuse incident light.

The base plate 101 serves as a substrate on which the linear side emitters 10 are arranged in a plurality of lines. The base plate 10 may be a printed circuit board (PCB) arranged such that a plurality of LED chips 11 included in the linear side emitter 10 are electrically connected to the PCB. The PCB for driving the linear side emitters 10 may be provided separately from the base plate 101.

The linear side emitters 10 are arranged in a plurality of lines on the base plate 101 as illustrated in FIG. 9.

As described above, the use of the linear side emitters 10 in the backlight system 100 makes it possible to enhance the overall brightness uniformity of the backlight system 100 and to prevent dark portions from occurring at the corners of the backlight system 100.

The brightness uniformity of the backlight system 100 is an important factor in evaluating the quality of the surface light source. In general, the brightness at the corners is the lowest and thus the brightness uniformity of the backlight system 100 is degraded. However, the use of the linear side emitters 10 makes it possible to prevent dark portions from occurring at the corners and to thus improve the brightness uniformity.

The LED chips 11 for emitting light may be disposed on the substrate 105 such that they are coupled to the linear side emitters 10 as illustrated in FIG. 11.

Here, the LED chips 11 may be directly adhered to the seat region 15a of the bottom portion 15 in the linear side emitter 10 such that they are arranged in a line. Alternatively, the LED chips 11 may be arranged in a plurality of lines on the base plate 101 and the bodies of the linear side emitters 10 may be simultaneously coupled to the base plate 101 such that the LED chip 11 is adhered closely to the seat region 15a. In this case, the substrate 105 may be omitted.

In order to implement a white light source, LED chips 11 emitting different colors of light (for example, R, G and B colors) may be alternately arranged in the linear side emitter 10 constituting each line, or white LED chips may be arranged in the linear side emitter 10.

In this case, an LCD using the backlight system 100 can reproduce a color image.

The reflective diffusion plate 110 reflectively diffuses incident light upward. The reflective diffusion plate 110 is disposed on the base plate 101 such that it is disposed between the lines of the linear side emitters 10. the reflective diffusion plate 110 may be a single plate that is configured to have a plurality of elongated through holes for receiving the linear side emitters 10. Alternatively, the reflective diffusion plate 110 may be a plurality of separate plates, each of which is disposed between the neighboring two linear side emitters 10.

The transmissive diffusion plate 140 is disposed over the linear side emitters 10 such that it is disposed spaced apart from a lower portion 100a by a predetermined distance "d". The transmissive diffusion plate 140 transmissively diffuses incident light.

When the transmissive diffusion plate 140 is too close to the linear side emitter 10, a region where the linear side emitter 10 is located becomes brighter than any other region, thereby degrading the brightness uniformity of the backlight system 100. Conversely, when the transmissive diffusion plate 140 is too far from the linear side emitter 10, the backlight system 100 becomes thicker. Preferably, the distance "d" is determined such that it is minimized within a range where the diffused light can be mixed as well as desired. Of course, since the linear side emitters 10 can provide an excellent light mixing effect, the distance "d" can be greatly reduced.

Most of the light emitted from the LED chips 11 travels laterally through the sides 19. However, a portion of the emitted light may travel upward through the linear side emitters 10. This upward light may be about 20% of the total light emitted from the LED chips 11.

The LED chip 11 is not a point light source but is a light source having a given emission area. Therefore, even when the reflecting surface 17 of the linear side emitter 10 is formed to satisfy an internal total reflection condition, the internal total reflection cannot be satisfied for all the emitted light. Accordingly, a portion of the emitted light may travel upward through the linear side emitters 10. Meanwhile, it is very difficult to coat the reflection surface 17 with reflection coating such that the surface 17 becomes a complete total refraction surface. Therefore, the reflection surface is practically coated to have a suitable reflectance. Accordingly, a portion of the emitted light may travel upward through the linear side emitters 10.

The existence of the upward light may cause a light spot or a luminance line to appear at a position of the LED chip 11. Moreover, when R/G/B LED chips are alternately arranged in the linear side emitter 10, colored light may appear at the position of the LED chip 11.

Accordingly, the backlight system 100 may further include a plurality of reflective mirrors 120 for reflecting at least a portion of the upward light. In this case, the reflective mirrors 120 may be disposed above the respective linear side emitters 10 such that they are arranged on an optical plate 130 in a plurality of lines corresponding to the lines of the linear side emitters 10.

The optical plate 130 may be made of transparent polymethyl-methacrylate (PMMA) for transmitting incident light. Alternatively, the optical plate 130 may be a transmissive diffusion plate.

The reflective mirrors 120 may be spaced apart from the linear side emitters 10 by a predetermined distance. In order to maintain the predetermined distance, the optical plate 130 may be supported by support members 135. The support members 135 support the optical plate 130 against the reflective diffusion plate 110 or the base plate 101.

When a transmissive diffusion plate is used as the optical plate 130 in addition to the reflective diffusion plate 110 and the transmissive diffusion plate 140, the emitted light can be diffused more sufficiently. In this case, the distance "d" between the transmissive diffusion plate 140 and the linear side emitters 10, that is, a distance between the transmissive diffusion plate 140 and the lower portion 100a, can be reduced and thus the backlight system 100 can be reduced in thickness.

When a transmissive diffusion plate, rather than the transparent PMMA material, is used for the optical plate 130, the light transmissivity may be relatively degraded. Accordingly, whether a transmissive diffusion plate or a transparent PMMA is used for the optical plate 130 may be determined according to whether emphasis must be placed on an improved light emission rate from the LED chips 11 or on a reduced thickness of the backlight system. That is, when the improved light emission rate is more important than the reduced thickness, a transmissive diffusion plate may be used as the optical plate 130, and vice versa.

Meanwhile, the backlight system 100 may further include a brightness enhancement film (BEF) 150 for enhancing the directionality of light exiting the transmissive diffusion plate 140. Also, the backlight system 100 may further include a polarization enhancement film (PEF) 170 for enhancing polarization efficiency.

The BEF 150 refracts and condenses the light exiting the transmissive diffusion plate 140, thereby enhancing the directionality of the light and thus the brightness of the light.

For example, the PEF 170 transmits a p-polarized light and reflects an s-polarized light such that incident light entering the PEF 170 is changed mostly into p-polarized light and then exits the PEF 170.

When the backlight system 100 is used in an LCD, the LCD includes a liquid crystal panel over the backlight system 100. As well known in the art, linearly-polarized light is incident on a liquid crystal layer of the liquid crystal panel and the direction of a liquid crystal director is changed by a driving voltage. Accordingly, the polarization of light passing through the liquid crystal layer is changed and thus an image is displayed.

When single-polarized light is incident on the liquid crystal panel, light efficiency can be enhanced. Accordingly, when the backlight system 100 further includes the PEF 170, the light efficiency can be enhanced.

When the backlight system 100 is used in the LCD, an image of uniform brightness can be produced while the LCD can be reduced in thickness based on the reduced thickness of the backlight system 100.

Figure 12:
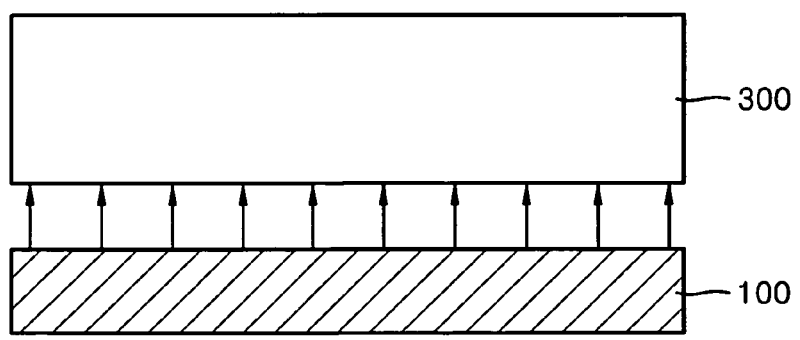
FIG. 12 is a schematic view of an exemplary liquid crystal display using the backlight system shown in FIG. 11.

FIG. 12 is a schematic view of an LCD using the backlight system 100 shown in FIG. 11.

Referring to FIG. 12, an LCD includes the backlight system 100 and a liquid crystal panel disposed over the backlight system 100. The backlight system 100 is connected to a driver circuit. The construction and operation of the liquid crystal panel are well known in the art and thus their detailed description will be omitted for conciseness.

As described above, the LED chips forming a line are arranged with a sufficient density in the linear side emitter according to the present invention, light generated from the LED chips is sufficiently mixed, and the sufficiently mixed light travels laterally. Accordingly, the use of the linear side emitter makes it possible to reduce the thickness of the backlight system and the LCD.

While the present invention has been particularly shown and described with reference to exemplary embodiments thereof, it will be understood by those of ordinary skill in the art that various changes in form and details may be made thereto without departing from the spirit and scope of the present invention as defined by the following claims.

What is claimed is:

1. A linear side emitter comprising:
a plurality of LED chips;
a bottom portion on which the LED chips are arranged in a line;
a reflecting surface, disposed above the bottom portion, which reflects light exiting the LED chips; and
side surfaces, formed at both sides of the LED chip array line, each having at least one bend formed therein, wherein the side surfaces transmit light reflected by the reflecting surface and light reflected first by the reflecting surface and then by the bottom portion.

2. The linear side emitter of claim 1, wherein the bottom portion is substantially flat or comprises:
a seat region having the LED chips arranged thereon; and
an inclined reflecting region which is stepped with respect to the seat region and which reflects light reflected first by the reflecting surface and then by the bottom portion, toward one of the side surfaces.

3. The linear side emitter of claim 1, wherein the LED chip array line comprises a plurality of LED chips which different colored light and which are arranged alternately in the LED chip array line, and wherein the different colored light is mixed by the at least one bend in the side surfaces.

4. The linear side emitter of claim 1, wherein the at least one bend in the side surfaces forms a sawtooth pattern.

5. The linear side emitter of claim 4, wherein the LED chip array line comprises a plurality of LED chips which emit different colored light and which are arranged alternately in the LED chip array line, and wherein the different colored light is mixed by the sawtooth pattern of the side surfaces.

6. The linear side emitter of claim 1, wherein the bottom portion is substantially flat or comprises:
a seat region having the LED chips arranged thereon; and
an inclined reflecting region which is stepped with respect to the seat region and which reflects light reflected first by the reflecting surface and then by the bottom portion, toward one of the side surfaces,
wherein the reflecting surface is upwardly inclined from the LED chip array line toward the side surfaces and is a curved surface symmetrical on both sides of the LED chip array line.

7. The linear side emitter of claim 6, wherein the reflecting surface is coated with reflection coating.

8. The linear side emitter of claim 6, wherein the reflecting surface has a curvature satisfying an internal total reflection condition of light incident thereon from the LED chip array line.

9. The linear side emitter of claim 8, wherein the reflecting surface is coated with reflection coating.

10. The linear side emitter of claim 1, wherein the reflecting surface is upwardly inclined from the LED chip array line toward the side surfaces.

11. The linear side emitter of claim 3, wherein the reflecting surface is a curved surface and is symmetrical on both sides of the LED chip array line.

12. The linear side emitter of claim 11, wherein the reflecting surface is coated with reflection coating.

13. The linear side emitter of claim 11, wherein the reflecting surface has a curvature satisfying an internal total reflection condition of light incident thereon from the LED chip array line.

14. The linear side emitter of claim 13, wherein the reflecting surface is coated with reflection coating.

15. A backlight system comprising:
a plurality of linear side emitters arranged in a plurality of lines on a base plate, each linear side emitter comprising:
a plurality of LED chips,
a bottom portion on which the LED chips are arranged in a line,
a reflecting surface, disposed above the bottom portion, which reflects light exiting the LED chips, and
side surfaces, formed at both sides of the LED chip array line, each having at least one bend formed therein, wherein the side surfaces transmit light reflected by the reflecting surface and light reflected first by the reflecting surface and then by the bottom portion;
a reflective diffusion plate which reflectively diffuses light received from the linear side emitters; and
a first transmissive diffusion plate, disposed over the linear side emitter, which transmissively diffuses light received from the linear side emitters and from the reflective diffusion plate.

16. The backlight system of claim 15, wherein the bottom portion is substantially flat or comprises:
a seat region having the LED chips arranged thereon; and
an inclined reflecting region which is stepped with respect to the seat region and which reflects light reflected first by the reflecting surface and then by the bottom portion, toward one of the side surfaces.

17. The backlight system of claim 15, wherein the bottom portion is substantially flat or comprises:
a seat region having the LED chips arranged thereon; and
an inclined reflecting region which is stepped with respect to the seat region and which reflects light reflected first by the reflecting surface and then by the bottom portion, toward one of the side surfaces,
wherein the reflecting surface is upwardly inclined from the LED chip array line toward the side surfaces and is a curved surface symmetrical on both sides of the LED chip array line.

18. The backlight system of claim 15, further comprising at least one of a brightness enhancement film which enhances the directionality of light exiting the first transmissive diffusion plate and a polarization enhancement film which enhances polarization efficiency.

19. The backlight system of claim 15, wherein the at least one bend in the side surfaces forms a sawtooth pattern.

20. The backlight system of claim 15, wherein the LED chip array line comprises a plurality of LED chips which emit different colored light and which are arranged alternately in the LED chip array line, and wherein the different colored light is mixed by the sawtooth pattern of the side surfaces.

21. The backlight system of claim 15, wherein the reflecting surface is upwardly inclined from the LED chip array line toward the side surfaces.

22. The backlight system of claim 21, wherein the reflecting surface is a curved surface and is symmetrical on both sides of the LED chip array line.

23. The backlight system of claim 22, wherein the reflecting surface has a curvature satisfying an internal total reflection condition of light incident thereon from the LED chip array line.

24. A liquid crystal display comprising:
a liquid crystal panel; and
a backlight system which irradiates light on the liquid crystal panel;
wherein the backlight system comprises:
a plurality of linear side emitters arranged in a plurality of lines on a base plate, each linear side emitter comprising:
a plurality of LED chips,
a bottom portion on which the LED chips are arranged in a line, a reflecting surface, disposed above the bottom portion, which reflects light exiting the LED chips, and side surfaces, formed at both sides of the LED chip array line, each having at least one bend formed therein, wherein the side surfaces transmit light reflected by the reflecting surface and light reflected first by the reflecting surface and then by the bottom portion;

a reflective diffusion plate which reflectively diffuses light received from the linear side emitters; and a first transmissive diffusion plate, disposed over the linear side emitter, which transmissively diffuses light received from the linear side emitters and from the reflective diffusion plate.

25. The liquid crystal display of claim 24, wherein the bottom portion is substantially flat structure or comprises:

a seat region having the LED chips arranged thereon; and an inclined reflecting region which is stepped with respect to the seat region and which reflects light reflected first by the reflecting surface and then by the bottom portion, toward one of the side surfaces.

26. The liquid crystal display of claim 24, wherein the bottom portion is substantially flat or comprises:

a seat region having the LED chips arranged thereon; and an inclined reflecting region which is stepped with respect to the seat region and which reflects light reflected first by the reflecting surface and then by the bottom portion, toward one of the side surfaces, wherein the reflecting surface is upwardly inclined from the LED chip array line toward the side surfaces and is a curved surface symmetrical on both sides of the LED chip array line.

27. The liquid crystal display of claim 26, wherein the backlight system further comprises at least one of a brightness enhancement film which enhances the directionality of light exiting the first transmissive diffusion plate and a polarization enhancement film which enhances polarization efficiency.

28. The liquid crystal display of claim 26, wherein the at least one bend in the side surfaces forms a sawtooth pattern.

29. The liquid crystal display of claim 26, wherein the LED chip array line comprises a plurality of LED chips which emit different colored light and which are arranged alternately in the LED chip array line, and wherein the different colored light is mixed by the at least one bend in the side surfaces.

30. The liquid crystal display of claim 24, wherein the reflecting surface is upwardly inclined from the LED chip array line toward the side surfaces.

31. The liquid crystal display of claim 30, wherein the reflecting surface is a curved surface and is symmetrical on both sides of the LED chip array line.

32. The liquid crystal display of claim 31, wherein the reflecting surface has a curvature satisfying an internal total reflection condition of light incident thereon from the LED chip array line.

* * * * *